US012626482B2

(12) United States Patent (10) Patent No.: US 12,626,482 B2
Johnson et al. (45) Date of Patent: May 12, 2026

(54) SPEED AND SLIP DETERMINATIONS FOR A VEHICLE USING OPTICAL FLOW TECHNOLOGY

(71) Applicant: Michigan Scientific Corporation, Milford, MI (US)

(72) Inventors: Thomas Johnson, Pinckney, MI (US); Hugh W. Larsen, Milford, MI (US)

(73) Assignee: Michigan Scientific Corporation, Milford, MI (US)

( * ) Notice: Subject to any disclaimer, the term of this patent is extended or adjusted under 35 U.S.C. 154(b) by 706 days.

(21) Appl. No.: 18/013,123

(22) PCT Filed: Jul. 8, 2021

(86) PCT No.: PCT/US2021/040970
§ 371 (c)(1),
(2) Date: Dec. 27, 2022

(87) PCT Pub. No.: WO2022/011196
PCT Pub. Date: Jan. 13, 2022

(65) Prior Publication Data
US 2023/0237766 A1 Jul. 27, 2023

Related U.S. Application Data

(60) Provisional application No. 63/088,033, filed on Oct. 6, 2020, provisional application No. 63/049,483, filed on Jul. 8, 2020.

(51) Int. Cl.
*G06V 20/56* (2022.01)
*B60W 40/101* (2012.01)
(Continued)

(52) U.S. Cl.
CPC ......... *G06V 10/751* (2022.01); *B60W 40/101* (2013.01); *B60W 40/105* (2013.01); *G06V 20/56* (2022.01); *B60W 2520/20* (2013.01)

(58) Field of Classification Search
CPC ... G06V 10/751; G06V 20/56; B60W 40/101; B60W 40/105; B60W 2520/20;
(Continued)

(56) References Cited

U.S. PATENT DOCUMENTS 9,607,220 B1 3/2017 Smith et al.
10,380,757 B2 * 8/2019 Robinson ............... G06V 20/56
(Continued)

FOREIGN PATENT DOCUMENTS

CN 101514993 A * 8/2009
CN 103587467 B * 11/2015
(Continued)

*Primary Examiner* — Carol W Chan
(74) *Attorney, Agent, or Firm* — Young Basile Hanlon & MacFarlane, P.C.

(57) ABSTRACT
A vehicle speed and/or slip of a vehicle is determined. At least first and second images of a traveling surface captured by an image sensor using an optical lens are received by a processor. The images are used to determine the distance travelled by one or more pixels in first and second directions. These distances, along with the sampling rate of the image sensor, determine pixel speed in the first and second directions. The pixel speeds in the first direction, the second direction, or both, may be used to calculate the vehicle speed, a side slip angle, or a longitudinal slip. A tire speed may also be similarly determined using a second image sensor, a second optical lens, and a second processor capturing images of the tire surface. These vehicle parameters may be used for testing or operating the vehicle, including modifying vehicle behavior during operation.

17 Claims, 8 Drawing Sheets

(51) Int. Cl.
    *B60W 40/105*       (2012.01)
    *G06V 10/75*       (2022.01)

(58) Field of Classification Search
    CPC ........... G06T 2207/30252; G06T 7/20; G01M
                                17/007; G01P 3/36
    See application file for complete search history.

(56)             References Cited

U.S. PATENT DOCUMENTS

| | | | | |
|---|---|---|---|---|
| 2003/0125864 | A1* | 7/2003 | Banno ................. | B60W 10/184 |
| | | | | 701/84 |
| 2011/0043639 | A1* | 2/2011 | Yokohata ............. | H04N 5/2625 |
| | | | | 348/169 |
| 2016/0147230 | A1 | 5/2016 | Munich et al. | |
| 2016/0189393 | A1* | 6/2016 | Rao ......................... | G01S 11/12 |
| | | | | 382/104 |
| 2016/0293003 | A1* | 10/2016 | Ng ........................ | G08G 1/0141 |
| 2017/0102467 | A1* | 4/2017 | Nielsen ................... | G01S 19/47 |

FOREIGN PATENT DOCUMENTS

| | | | | | |
|---|---|---|---|---|---|
| CN | 107609486 | A | * | 1/2018 | |
| CN | 107689063 | A | * | 2/2018 | ............. G06T 7/269 |
| CN | 110189377 | A | * | 8/2019 | .............. G06T 7/73 |
| JP | 2001358984 | A | * | 12/2001 | |
| JP | 2006072480 | A | * | 3/2006 | |
| JP | 2006162353 | A | * | 6/2006 | |
| KR | 20080041890 | A | * | 5/2008 | ........... A47L 9/2805 |
| WO | WO-2017189185 | A1 | * | 11/2017 | ........... G01S 17/931 |
| WO | 2020/000320 | A1 | | 1/2020 | |

\* cited by examiner

SPEED AND SLIP DETERMINATIONS FOR A VEHICLE USING OPTICAL FLOW TECHNOLOGY

CROSS-REFERENCE(S) TO RELATED APPLICATION(S)

This application claims priority to U.S. Provisional Application No. 63/049,483, filed Jul. 8, 2020, and to U.S. Provisional Application No. 63/088,033, filed Oct. 6, 2020, each of which is incorporated herein in its entirety by reference.

TECHNICAL FIELD

This disclosure relates generally to determining speed and slip values for vehicle usage and vehicle performance improvement using optical flow technology.

BACKGROUND

Vehicle testing and evaluation commonly requires real-time performance monitoring of operating vehicles. This often includes determination of the actual or true speed of the vehicle and/or a tire of the vehicle. Speed has tradition-ally been determined by monitoring the rotation of the vehicle wheels during operation. True speed often differs from the speed determined in such a manner.

SUMMARY

An aspect of the teachings herein is a method that includes receiving a sequence of images of a traveling surface captured by an image sensor using an optical lens, wherein the image sensor is arranged on a vehicle with a wheel in contact with the traveling surface, the image sensor has a sampling rate, and the optical lens is arranged between the image sensor and the traveling surface. The method also includes determining a first distance traveled by one or more pixels in a longitudinal direction along the traveling surface by comparing at least two images of the sequence, determining a second distance traveled by one or more pixels in a lateral direction along the traveling surface by comparing at least two images of the sequence, determining a first pixel speed in the longitudinal direction using the first distance and the sampling rate, and determining a second pixel speed in the lateral direction using the second distance and the sampling rate. Further, the method incudes determining at least one of a vehicle speed using at least one of the first pixel speed or the second pixel speed, a side slip using the first pixel speed and the second pixel speed, or a longitudinal slip using the first pixel speed and a tire speed, and outputting the at least one of the vehicle speed, the side slip, or the longitudinal slip for modifying a vehicle operation.

An aspect of the teachings herein is an apparatus that includes an image sensor arranged on a vehicle with at least one wheel in contact with a traveling surface, the image sensor having a sampling rate, an optical lens arranged between the image sensor and the traveling surface, and a processor coupled to the image sensor. The processor is configured to receive a sequence of images of the traveling surface captured by the image sensor using the optical lens, determine a first distance traveled by one or more pixels in a longitudinal direction along the traveling surface by comparing at least two images of the sequence, determine a second distance traveled by one or more pixels in a lateral direction along the traveling surface by comparing at least two images of the sequence, determine a first pixel speed in the longitudinal direction using the first distance and the sampling rate, determine a second pixel speed in the lateral direction using the second distance and the sampling rate, determine at least one of a vehicle speed using at least one of the first pixel speed or the second pixel speed, a side slip using the first pixel speed and the second pixel speed, or a longitudinal slip using the first pixel speed and a tire speed, and output the at least one of the vehicle speed, the side slip, or the longitudinal slip for modifying a vehicle operation.

Another aspect of the teachings herein is an apparatus that includes an image sensor arranged on a vehicle with at least one wheel in contact with a traveling surface, the image sensor having a sampling rate, an optical lens arranged between the image sensor and a wheel surface, and a processor coupled to the image sensor. The processor is configured to receive a sequence of images of the wheel surface captured by the image sensor using the optical lens, determine a first distance traveled by one or more pixels in a longitudinal direction by comparing at least two images of the sequence, determine a second distance traveled by one or more pixels in a lateral direction by comparing at least two images of the sequence, determine a first pixel speed in the longitudinal direction using the first distance and the sampling rate, determine a second pixel speed in the lateral direction using the second distance and the sampling rate, determine a tire longitudinal speed using the first pixel speed, determine a tire lateral speed using the second pixel speed, and output at least one of the tire longitudinal speed or the tire lateral speed for modifying a vehicle operation.

Details of these and other aspects of the teachings herein are described in further detail below with reference to the drawings.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Moreover, like reference numbers refer to like elements unless otherwise noted or clear from context.

DETAILED DESCRIPTION

Figure 1A:
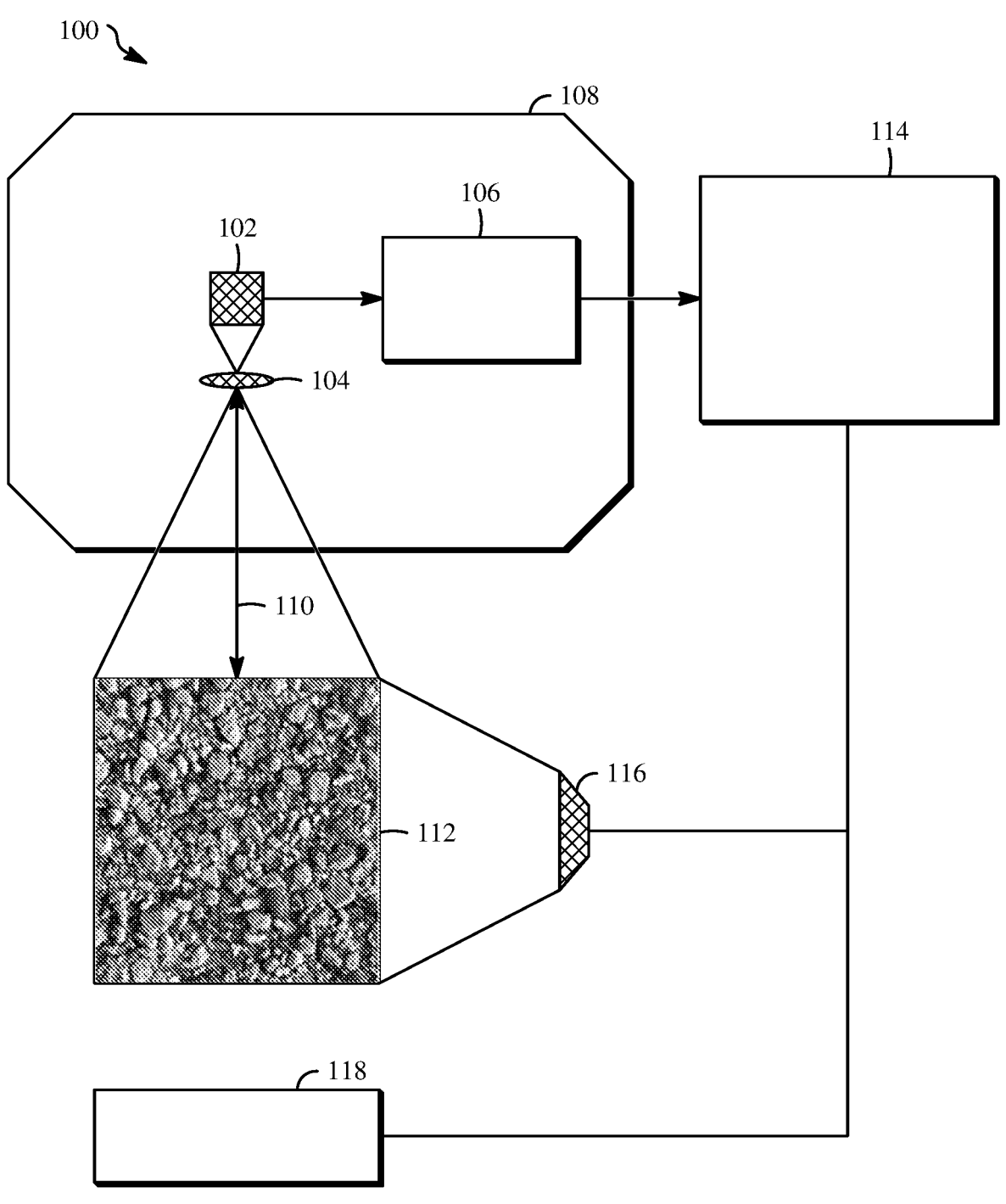
FIG. 1A is a schematic diagram of an apparatus for determining vehicle parameters, such as vehicle speed, slip, etc., according to the teachings herein.

Speed measurement based on monitoring of wheel speed, as described above, is prone to inaccuracies due to slippage of the tires at the traveling surface. Shear deformation of the sidewalls and sliding of the tread of the tires due to deformation at the traveling surface results in the measured distance of the rotating wheel being less than the value calculated from the rotation of a perfect tire. This slip can result in errors in speed (and similarly in velocity) calculations based on wheel rotation measurements. Additionally, during cornering of the vehicle, lateral or side forces are exerted on the tires at the contact surface with the road. These lateral forces can cause the wheel to move and slide at an angle relative to the plane of the wheel. This further introduces inaccuracies in vehicle speed calculations based on wheel rotation. Braking or acceleration of the vehicle increases the level of slip and further compromises the accuracy of vehicle speed measurements.

Accurate determination of vehicle speed is important for both evaluation and testing of a vehicle, as well as customer use of functional components such as anti-lock brakes. Deviations from true speed can negatively impact the performance of these components and may result in inaccurate vehicle testing results. In addition, the vehicle performance characteristics may be utilized by additional vehicle components to improve their operation such as in anti-lock braking or other vehicle components that utilize vehicle speed to adjust their own operational performance.

A methodology for accurate longitudinal vehicle speed measurement has included mechanical fifth wheel technology. A fifth wheel, such as a bicycle type wheel, is mounted to the vehicle for measurement of speed. This approach is typically not suitable for use on vehicles during consumer usage of the vehicle. In addition, such a measurement device does not always accurately reflect true speed due to irregular fifth wheel motions on rough roads and while cornering.

Global Positioning Systems (GPS) have been utilized for measurement of true vehicle speed and velocity with reasonable accuracy. However, accurate systems are often very expensive. In addition, they can only accurately operate where a clear signal path is available to orbital satellites. This prevents their operation in tunnels or other obstructed locations. Furthermore, GPS systems are not able to accurately measure side slip when the vehicle is cornering or is driving on a surface with side slope. For these reasons, GPS systems are not suitable for measuring true vehicle speed and slip as is desired in many testing scenarios and operational systems.

Complex optical systems may be used to measure true vehicle speed, but these systems are often bulky, expensive, and some may fail to directly measure vehicle side slip. Instead, complex calculations are utilized by these systems to compare true vehicle speed to the speed measured at the wheels to provide an estimation of slip.

In contrast, the teachings herein provide accurate and reliable information on vehicle true speed and slip, such as side slip, longitudinal slip, or both side slip and longitudinal slip. Optical flow may directly monitor pixel flow of images captured from a traveling surface. The distance traveled by one or more pixels, when combined with the sampling rate of the image sensor, may be used to calculate velocities in X- and Y-directions. A height sensor may utilize optical, sonic, or inertial systems to determine the proper calibration of the speed signals. The two directional velocities may be used to further calculate a vehicle side slip angle. Further, the speed signal from the sensor, along with a wheel speed sensor signal, may be used to determine longitudinal slip. Finally, the determined parameters may be output for performance monitoring or use in other vehicle systems.

Figure 1B:
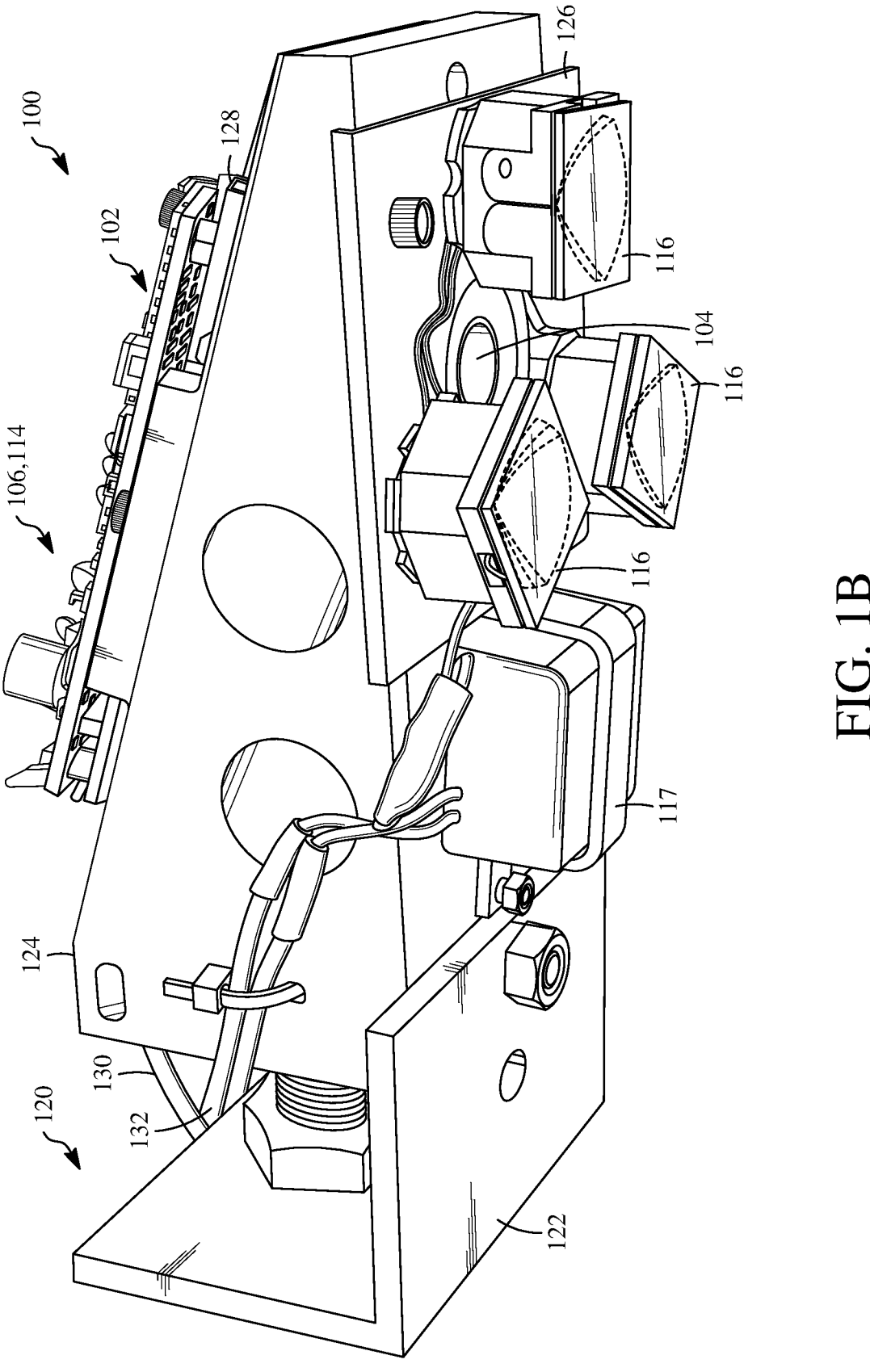
FIG. 1B is a diagram of an example of the hardware of the apparatus of FIG. 1A.

FIGS. 1A and 1B show an example of an apparatus 100 for determining vehicle parameters such as speed, slip, etc. FIG. 1A is a schematic diagram of the apparatus 100, and FIG. 1B is an example of the hardware of the apparatus 100 of FIG. 1A.

The apparatus 100 may include an image sensor 102, an optical lens 104, and an image processor 106. Together, the image sensor 102, the optical lens 104, and image processor 106 are assembled to form an optical device 108.

In one example, the image processor 106 is a 2-dimensional or planar optical flow processor. The optical lens 104 may be mounted to project an image of the traveling surface (i.e., the surface on which the wheel travels) onto the image sensor 102. In the examples described herein, the traveling surface 112 is a road surface, but the traveling surface 112 is any surface on which a wheel may travel, such as a test track, an off-road surface, etc. Further, the traveling surface 112 encompasses a surface that moves beneath a vehicle, such as in a test facility. The optical lens 104 may be mounted at working distance 110 from the surface area (e.g., the traveling surface 112) to be captured, and has a focal length that is located at some point along the working distance 110. It should be understood that the term working distance is utilized in a broad and non-limiting nature and can encompass any adjustments to allow the optical device 108 to receive accurate and clear images of the surface area that it is intended to capture. In an example, the working distance 110 is fixed. In an example, the working distance 110 is dynamic to accommodate movement of the optical lens 104 relative to the surface 112 (e.g., when the apparatus 100 is mounted to vehicle operating outside of a test facility). In an example, the working distance 110 is between one and five feet, inclusive. When the working distance 110 is about 12 inches, for example, the focal length is about 1 inch. In another example, the working distance 110 is between four inches and five feet, inclusive.

The image sensor 102 may be any number of imaging sensors including, but not limited to, visible light sensors, infra-red sensors, broad spectrum sensors, and multi-spectrum sensors. Similarly, the image sensor 102 may comprises a wide variety of pixel densities and sampling rates. In an example, the image sensor 102 has an 8 Hz sampling rate. In another example, the image sensor 102 has an adjustable sampling rate that may reach or exceed 10,000 Hz.

The apparatus 100 may also include a data processor 114 to perform statistical analysis of the data received from the image processor 106. The data processor 114 may be part of (e.g., incorporated into) the image processor 106. Alternatively, the data processor 114 may be external to the image processor 106, and optionally even the optical device 108, to allow for remote processing of the data received by the optical device 108. The data processor 114 may include executable instructions for X-direction and Y-direction vector calculations, slip calculations, controller area network (CAN) output or other format digital outputs, or an analog output. These executable instructions will be discussed in greater detail below. Hereinbelow, and in the claims, the term processor may be used to refer to one or both of the image processor 106 and the data processor 114.

The apparatus 100 as shown includes an illumination system 116 that assists the image sensor 102 in combination with the optical lens 104 to properly capture images of the traveling surface 112. The illumination system 116 is not required in all embodiments of the apparatus 100. However, the illumination system 116 is desirably included because the relatively uniform light it provides may reduce variations in the appearance of pixels between captured images, reducing errors in the determination of pixel locations between the captured images.

In an example, the illumination system 116 comprises a light emitting diode illumination system (LED illumination system) or lighting arrangement. In an example, the illumination system 116 comprises an infra-red or other thermal lighting arrangement. In an example, the illumination system 116 comprises single spectrum lighting matched with the sensitive wavelengths of the image sensor 102. The illumination system 116 does not share a power supply 117 with the optical device 108 in the illustrated example (see FIG. 1B). For example, the illumination system 116 may receive power directly from a vehicle upon which the apparatus 100 is mounted. Alternatively, the illumination system 116 share a power supply with the optical device 108.

The illumination system 116 may be mounted in close proximity to the optical device 108 (e.g., adjacent to the optical lens 104). The illumination system 116 may be mounted remotely from the optical device 108 but still be directed towards the portion of the traveling surface 112 within the working distance 110 of the optical lens 104. Although shown separately in FIG. 1A, the illumination system 116 may be mounted with the optical lens 104.

In this example, and as shown in there are three light emitting diodes (e.g., with their respective lenses) forming the illumination system 116. However, this is not required as various arrangements of the illumination system 116 are possible. For example, the illumination system 116 may comprise two or more strings or strips of light elements. In some implementations, infra-red light elements, white light elements, or some combination of infra-red light elements and white light elements may be used. Strings of white LEDs or strips of red LEDs may be used. In some implementations, a plurality of incandescent lights may be used. These are merely illustrative examples. It is contemplated that any illumination system 116 may be used that would be complementary to the sensitivity and receptive wavelengths of the image sensor 102 within the optical device 108.

In some implementations, the apparatus 100 includes a (e.g., dynamic) height sensor 118 coupled to the image processor 106 and/or the data processor 114 to monitor the height of the optical lens 104 above the traveling surface 112. The dynamic height sensor 118 may be utilized for automatically focusing the optical lens 104, either electronically or with an autofocus assembly, when in a dynamic environment (such as when mounted to a vehicle) or for data correction of the imaging received by the image sensor 102. Height sensing may be added to accommodate vehicle roll, pitch, and bounce, which can alter the distance from the sensor to the road, and which can affect speed calibration. In some examples, this distance may be measured with ultrasonic devices, laser (Lidar) distance measurement devices, or inertial (accelerometer and gyroscopic) measurement devices. Further details on height sensing will be discussed below with regards to FIGS. 7-9.

Figure 2:
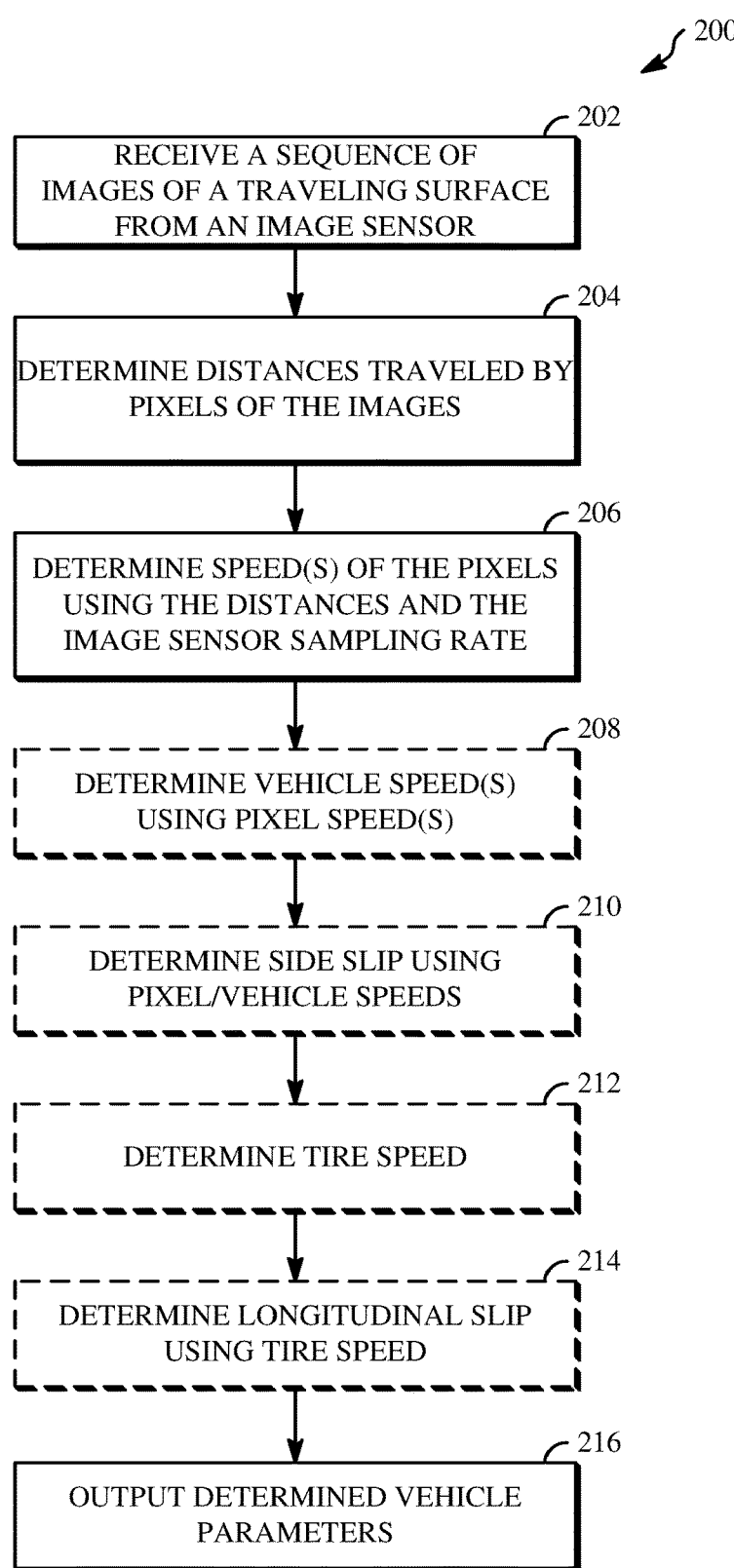
FIG. 2 is a flow chart of a method of determining vehicle parameters according to the teachings herein.

FIG. 2 is a flowchart illustrating a method 200 of determining vehicle parameters, such as speed and slip. The method 200 can be performed using the apparatus 100 under the control of a processor (e.g., the image processor 106 and the data processor 114) when mounted on a vehicle.

Figure 3:
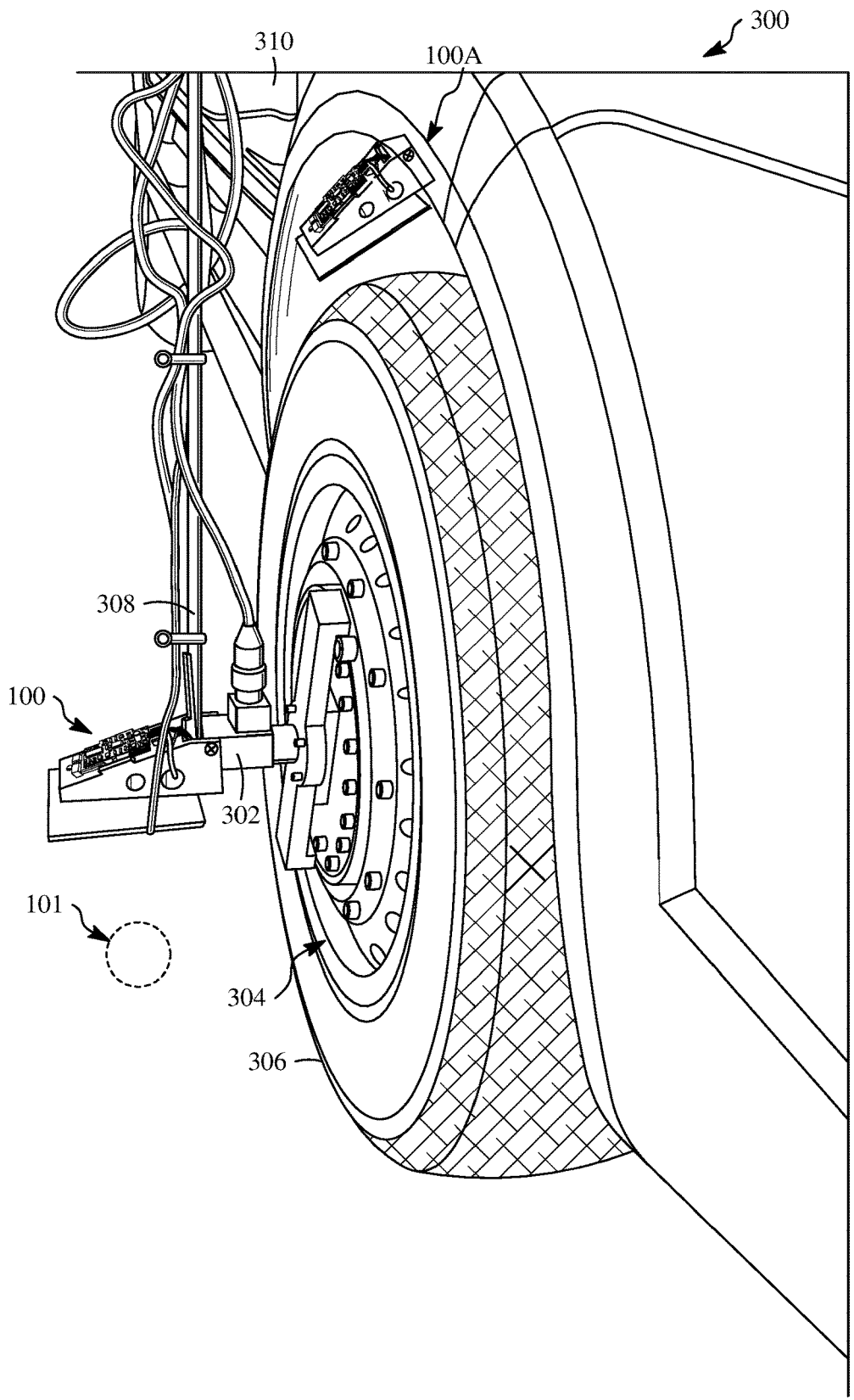
FIG. 3 is a diagram of how the apparatus of FIGS. 1A and 1B may be mounted on a vehicle.

FIG. 3 shows one example of how the apparatus 100 may be mounted on a vehicle 300 for use in the method 200. In FIG. 3, the apparatus 100 is mounted on a (e.g., bearing 302 of) of a slip ring of a wheel force transducer system 304 for a tire or wheel 306 of the vehicle 300. By mounting the apparatus 100 on bearing 302 so that the optical device 108 positioned at the spindle center of the rotating wheel 306, the apparatus 100 can be integrated into the wheel force transducer system 304 to provide complementary vehicle data to that being monitored by the wheel force transducer system 304. Although a wheel force transducer system 304 is referenced, wheel torque transducers and other transducers are also contemplated.

Referring back to FIG. 1B, the apparatus 100 may include a mounting system 120 for mounting the apparatus 100 to a vehicle. The mounting system 120 may include a bracket 122 formed of a rigid material such as steel. In this example, the bracket 122 is generally L-shaped, but other shapes are possible. The vertically-extending portion of the bracket 122 may be affixed to body of a vehicle. For example, and although not expressly shown in FIG. 3, the apparatus 100 may be mounted at various other locations on or in the vehicle 300, such as on a bumper or within a body chassis, body frame, or body panel 310. Where the apparatus 100 is mounted at a wheel, such as the wheel 306, the vertically-extending portion of the bracket 122 may be affixed to the bearing 302. The mounting system 120 may be secured to the vehicle 300 using any known securing means, such as bolts and magnetic couplings.

A component support 124 is secured to the horizontally-extending portion of the bracket 122. The component support 124 supports the hardware of the apparatus 100. Namely, on a surface of the component support 124 that will face a surface being measured to determine the vehicle parameters, such as the traveling surface 112, a mounting plate 126 securely supports the illumination system 116 and includes an opening through which the optical lens 104 can receive image data. The power supply 117 and the height sensor 118 may be secured to the same surface, apart from the mounting plate 126. In some implementations, the power supply 117 may be mounted to another surface of the component support 124. The component support 124 may be made of a stiff plastic that is desirably relatively light to minimize the additional weight on the vehicle. The component support 124 has a wedge shape, but this is an example. Other shapes are possible. The mounting plate 126 may be made of a material, such as aluminum, that serves as a heat sink for the light elements of the illumination system 116.

The circuitry for controlling the apparatus 100, such as the image processor 106 and the data processor 114, along with the image sensor 102, may be mounted on a circuit board 128 secured to the component support 124. As shown, the circuit board 128 is secured on a surface of the component support 124 opposite from the surface supporting the mounting plate 126, but this is not a necessary configuration. The circuit board 128 may be mounted elsewhere on the component support 124. The circuitry for controlling the apparatus 100 herein, including the optical device 108, may include an LED driver in communication with the illumination system 116 to transmit power to the illumination system 116 from its power source (e.g., the vehicle or the power supply 117). The circuitry may also include circuitry for distance-to-image (e.g., height) measurement and calibration as described herein, and circuitry for communication with the digital (e.g., CAN) or analog outputs described above with reference to the data processor 114. This circuitry for communications may include a Bluetooth, Wifi, or other wireless communication transmitter to allow the apparatus 100 to be mounted in a remote (e.g., difficult to reach) location while still transmitting information on vehicle speed and slip. Because measurements may include traveling surface irregularities, there may be random fluctuations in the data detected or otherwise determined, the image processor 106 may include or implement sub-routines that filter, smooth, average, or otherwise manage these fluctuations to output relatively accurate values under such conditions.

One or more signal conductors 130 may extend from the apparatus 100 to transmit signals to and from the apparatus 100. The signals may include vehicle parameters determined by the apparatus 100 described herein. The signals may include control signals to turn on or off the apparatus 100, or to otherwise control the apparatus 100. One or more power conductors 132 may provide energy to the power supply 117, the illumination system 116, or both, from an external power source.

When the apparatus 100 is mounted to a slip ring bearing on a wheel, such as the bearing 302 as shown in FIG. 3, a vertical restraint 308 may extend from the bearing 302 and be secured to the panel 310 of the vehicle 300 to reduce the motion of the apparatus 100 during operation.

Regardless of where the apparatus 100 is mounted on the vehicle, the optical lens 104 may be mounted at a default or initial working distance 110 from the traveling surface, represented by the spot 101 in FIG. 3. The default or initial working distance 110 may be a working distance used to calibrate the output of the apparatus 100 (e.g., the optical device 108) as discussed in more detail below.

Using the apparatus 100 mounted to a vehicle, such as the vehicle 300, the method 200 of FIG. 2 performs a series of calculations using the optical flow detected by the image processor 106 shown in FIGS. 1A and 1B. The method 200 can be explained, in part, using FIGS. 4A and 4B.

At 202, a sequence of images of a traveling surface is received. For example, the image sensor 102 may capture images of the traveling surface 112. A first sequential image 402 and a second sequential image 404 are temporally separated by the sampling rate of the image sensor 102. Therefore, there will be a change in the locations of individual pixels 406 captured by the image sensor 102 between the first sequential image 402 and the second sequential image 404 if the optical device 108 has moved relative to the traveling surface 112 (or the traveling surface 112 has moved relative to the optical device 108, such as in a test environment). That is, there is relative movement between the traveling surface 112 and the vehicle in the captured images. The method 200, using the image processor 106, can monitor pixels 406 in a variety of fashions. In an example, the image processor 106 monitors individual pixels 406, or groups of pixels, by brightness and/or by color. In an example, the image processor 106 monitors defined edges within the image. The present image illustrates the movement of a single pixel. However, it is contemplated that multiple pixels are tracked over a plurality of sequential images to provide reliable data. For example, at least two images may be compared to determine the distance traveled by at least 32 pixels in some implementations.

Figure 4A:
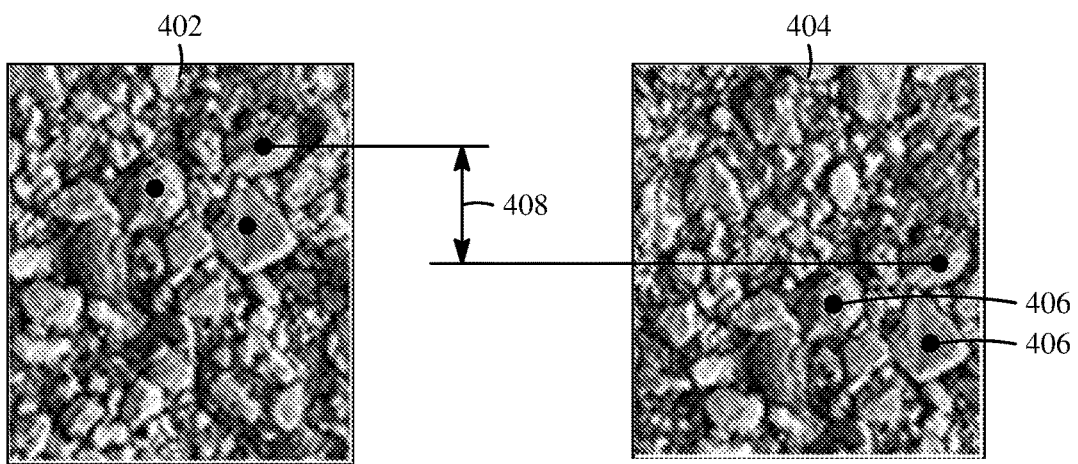
FIG. 4A is an example of a first pixel speed determination in the method of FIG. 2.
Figure 4B:
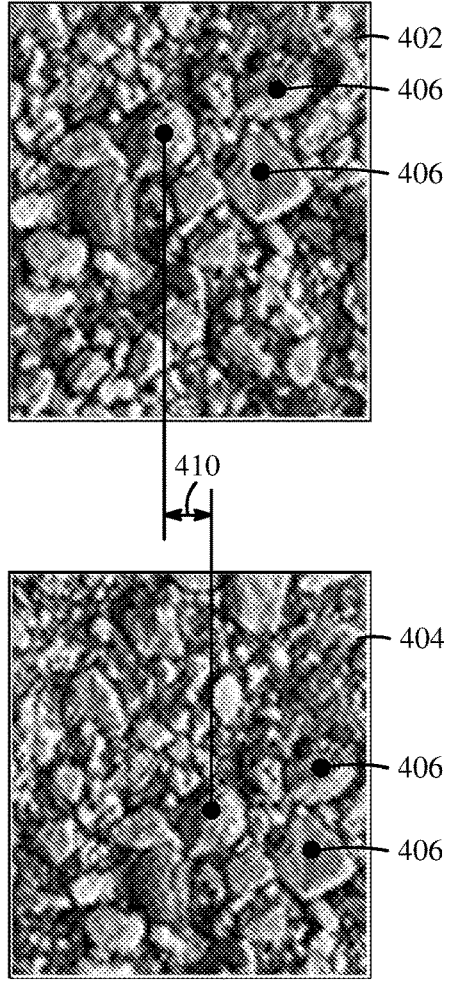
FIG. 4B is an example of a second pixel speed determination in the method of FIG. 2.

At 204, the method 200 determines distances traveled by one or more pixels in the images using an optical flow process. For example, the method 200 determines how far pixels travel in X- and Y-directions over one or more sampling intervals. As shown in FIG. 4A, for example, a pixel 406 may be measured as it moves from the first sequential image 402 to the second sequential image 404, resulting in a first distance 408. The first distance 408 represents the distance (e.g., a number of pixels) the pixel 406 has traveled in the X direction between the two images (also referred to as a delta-X distance). Similarly, as shown in FIG. 2B, a pixel 406 may be measured as it moves from the first sequential image 402 to the second sequential image 404, resulting in a second distance 410. The second distance 410 indicates the number of pixels that the pixel 406 has traveled in the Y direction between the two images (also referred to as a delta-Y distance). The X direction may correspond to a longitudinal direction, and the Y direction may correspond to a lateral direction. Accordingly, the first distance may be referred to as the longitudinal distance, and the second distance may be referred to as a lateral distance. Where multiple pixels are considered, the image processor 106 may filter, smooth, or otherwise combine the individual distance measurements to provide a single distance in each direction as output per cycle as described above.

Although two distances are determined in the above description, more may be used in other implementations. Further, in some implementations, such as where longitudinal slip is the only vehicle parameter of interest, only the distance resulting from pixel movement in the longitudinal direction may be determined.

The method 200 utilizes these distances along with the known sampling rate of the image sensor, such as the image sensor 102, to determine speed(s) of the pixels at 206. For example, a first pixel speed in the longitudinal direction (also called an X vector or a delta-X velocity) may be determined by dividing the first distance 408 by the sampling rate. Similarly, a second pixel speed in the lateral direction (also called a Y vector or a delta-Y velocity) may be determined by dividing the second distance 410 by the sampling rate. The apparatus 100 and the method 200 may include a second image sensor. The second image sensor may determine a third pixel speed. The third pixel speed may be determined in a same manner as the first pixel speed and the second pixel speed. Once these vectors are determined, they may be used to calculate or otherwise determine vehicle parameters as described starting at 208. In FIG. 2, each of the steps (e.g., operations, determinations, etc.) 208, 210, 212, and 214 are dashed to show that not each determination must be made in every implementation of the teachings herein. For example, only the first pixel speed in the longitudinal direction may be determined in some implementations.

Figure 5:
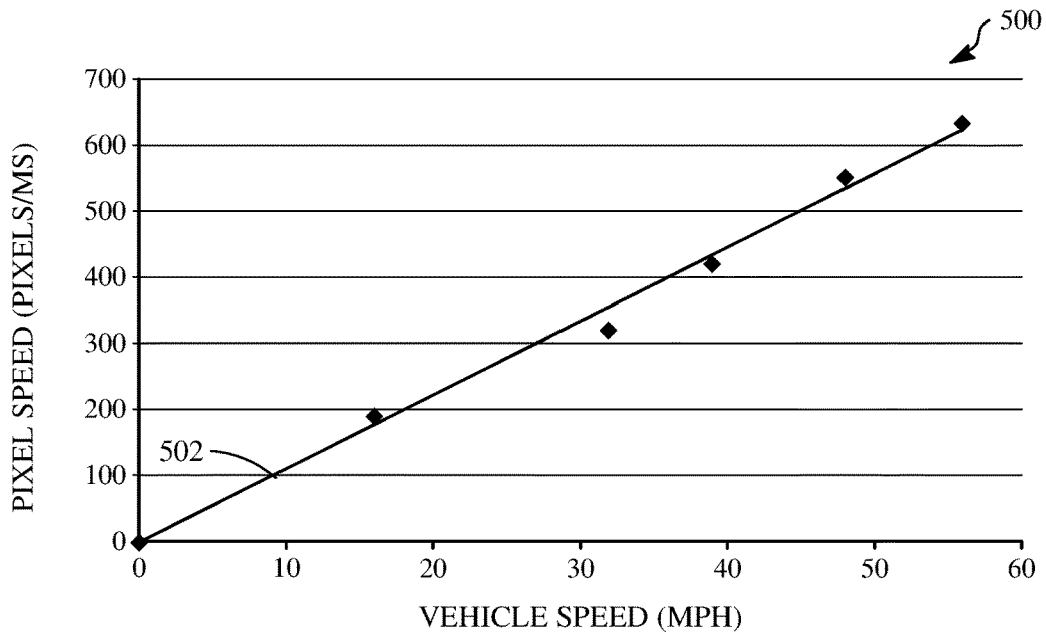
FIG. 5 is a graph of sensor output versus vehicle speed that illustrates a calibration used for determining a vehicle speed in the method of FIG. 2.

FIG. 5 is a graph 500 of pixel speed versus vehicle speed that illustrates a calibration used for determining a vehicle speed at 208 in the method 200. That is, FIG. 5 may be used for determining true vehicle speed using the first pixel speed, the second pixel speed, or both at 208. In an example, the calibration is performed and stored for use by the data processor 114.

The calibration may be performed by determining the pixel speed at each of a plurality of speed values (e.g., in miles per hour), with the apparatus 100 mounted in a test system at the initial or default working distance described herein. Then, the data may be used in a regression to determine a speed calibration value (e.g., the slope). For example, the image processor 106 may produce a pixel shift value (i.e., the distance traveled by pixels) described at 204 at certain time intervals (such as 1,000 times per second). As a result, the first distance 408 and the second distance 410, when divided by sampling rate, provide pixel speeds in pixels per millisecond. Using the pixel speed in one direction in the regression (e.g., the same calibration will result whichever direction is used) generates the best-fit line. In the example of FIG. 5, the resulting best-fit line from the regression has a formula pixel speed=11.084 (vehicle speed). In an example, the first pixel speed and the (e.g., speed) calibration value converts the first pixel speed to the vehicle speed.

The calibration value may be modified during operation of the apparatus 100 by way of communication with additional vehicle systems, such as described below with regards to FIGS. 7 and 8.

Using FIG. 4A as an example, a possible value for the first distance 408 is 100 pixels. Accordingly, the first pixel speed may be determined at 206 as 100 pixels/ms (i.e., 100 pixels/1 ms). At 208, the vehicle speed may be determined as approximately 9 MPH (i.e., 100/11.084). This is the longitudinal speed of the vehicle and is shown in FIG. 5 as point 502 on the graph 500. Alternatively, or additionally, a similar calculation may be performed at 208 to obtain the vehicle lateral speed using the second distance 410 and the second pixel speed. In other words, the first distance and hence the first pixel speed may be used to determine a vehicle speed, the second distance and hence the second pixel speed may be used to determine a vehicle speed, or both. In some implementations, the vehicle longitudinal speed $v_{long}$ (e.g., the longitudinal speed vector) and the vehicle lateral speed $v_{lat}$ (e.g., the lateral speed vector) respectively determined using the first pixel speed and the second pixel speed may be used to determine an overall vehicle speed (V) according to:

$$V = \sqrt{(v_{long}^2 + v_{lat}^2)}.$$

Referring back to FIG. 2, the method 200 may utilize the vehicle longitudinal speed and the vehicle lateral speed to determine a side slip. The side slip may be represented as a side slip angle, a side slip percentage, or other representation. The side slip may be described as the vehicle side slip herein for convenience. It is worth noting, however, that the determined side slip may be indicative for the mounting location only, depending upon what vehicle is being monitored. For example, to determine the overall vehicle side slip of a car, determinations of side slip could be made at multiple locations, such as at each of the four wheels and at a rear of the car.

Figure 6:
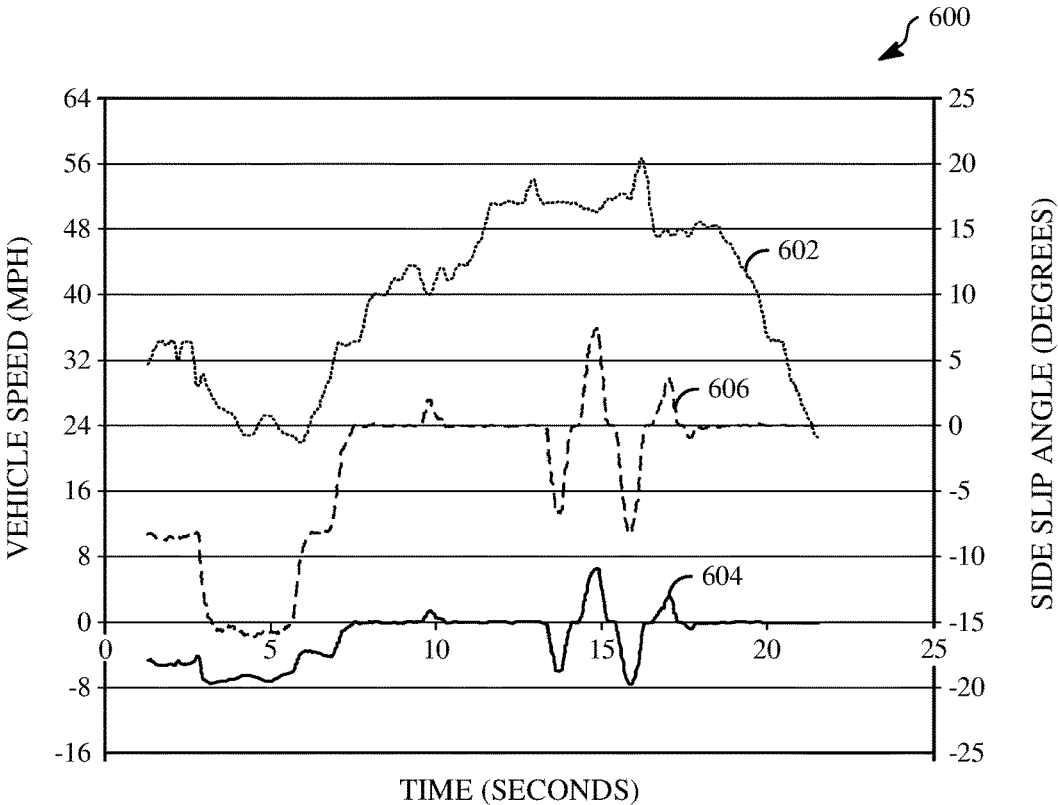
FIG. 6 is a graph that illustrates a side slip determination in the method of FIG. 2 using different values for the first pixel speed and the second pixel speed determined as described with respect to FIGS. 4A and 4B.

FIG. 6 is a graph 600 that illustrates a side slip determination at 210 in the method 200 of FIG. 2 using different values for the vehicle longitudinal speed and the vehicle lateral speed when determined at 208. The graph 600 depicts the vehicle longitudinal speed 602, the vehicle lateral speed 604, and the side slip angles 606 of a vehicle as it is being driven turning in a circle followed by a sine curve. The slip angle may be determined at 210 according to:

$$\alpha = -\arctan\left(\frac{\Delta V y}{|\Delta V x|}\right),$$

where α is the side slip angle 606, ΔVy is the vehicle lateral speed 604, and ΔVx is the vehicle longitudinal speed 602. It is worth noting that the vehicle lateral speed 604 exhibits both positive and negative values. This reflects that the lateral speed may represent movement to both the right and the left of the centerline of the vehicle. Here, for example, negative values may reflect a right turn, while positive values represent a right turn. While FIG. 6 and the formula above describe a slip angle calculation that uses the vehicle lateral speed determined from the second pixel speed and the vehicle longitudinal speed determined from the first pixel speed, the side slip may be determined at 210 using the first and second pixel speeds directly. This is because the calibration factor used to relate each pixel speed to vehicle speed is the same, so dividing the second pixel speed by the first pixel speed would result in the same value as dividing the vehicle lateral speed by the vehicle longitudinal speed. This is useful in embodiments of the teachings herein where the determination of vehicle speed(s) at 208 is omitted.

Another measure of speed relevant to operation of a vehicle is a tire speed. Software for a vehicle, such as an anti-lock braking system (ABS), a traction control system, and a chassis control system, may use both vehicle speed and tire speed. Tire speed may be useful in any vehicle having a tire, such as an agricultural vehicle, an aircraft, etc. Tire speed may be estimated at 212 by measuring wheel rotational speed, e.g., using wheel speed sensors, and then multiplying the wheel rotational speed by a fixed value of the tire radius. However, this is not always a measure of true tire speed. Techniques similar to those described above to determine the vehicle speed may be used to determine a more accurate tire speed at 212.

More specifically, an apparatus 100A similar to the apparatus 100, which may be a second apparatus in some implementations, is shown in FIG. 3. Although shown at the same wheels, the apparatus 100 and the apparatus 100A, when used together, may be located at different wheels, or the apparatus 100A may be located at a wheel while the apparatus 100 is located elsewhere on the body of a vehicle.

The apparatus 100A incorporates another sensor and optical lens similar to the image sensor 102 and the optical lens 104. The image sensor and optical lens focus on a tire surface, such as the tire tread in an example. In some implementations, a respective apparatus 100A may be focused on a respective tire surface of a vehicle when the vehicle has more than one tire. Preferably, the focus may be directed to the tire surface to measure movement of the tire in a similar manner as described with regards to FIGS. 4A and 4B. That is, similar to the method 200, the optical lens of the apparatus 100A is arranged between the image sensor and the tire or wheel surface. A processor (similar to the image processor 106 and the data processor 114) is coupled to the image sensor. The processor is configured to receive a sequence of images of the wheel surface captured by the image sensor using the optical lens as described with regards to 202 and to determine a first distance traveled by one or more pixels in a longitudinal direction by comparing at least two images of the sequence and a second distance traveled by one or more pixels in a lateral direction by comparing at least two images of the sequence as described with regards to 204 and FIGS. 4A and 4B. Thereafter, the processor of the apparatus 100A can determine a first pixel speed in the longitudinal direction using the first distance and the sampling rate and determine a second pixel speed in the lateral direction using the second distance and the sampling rate as described with regards to 206. The processor of the apparatus 100A can determine a tire longitudinal speed using the first pixel speed and a tire lateral speed using the second pixel speed as describes with regards to 208. Finally, the processor can output at least one of the tire longitudinal speed or the tire lateral speed for modifying a vehicle operation.

While the processing is very similar for determining a tire speed as determining a vehicle speed, there are some differences. For example, the working distance for the apparatus 100A monitoring the tire/wheel may be different from the working distance 110 described previously, and the calibration value for determining pixel speed with tire speed may be different. An initial, default working distance may be similarly determined and used for calibrating the speeds. The distance from the mounting location of the optical lens of the apparatus 100A to the tire surface may be assumed to be unchanged, or another height sensor may be used in a similar manner as described with regards to the height sensor 118. An illumination system may be used with the apparatus 100A or may be omitted.

Whether the tire speed is estimated according to conventional techniques or is determined using an apparatus according to the teachings herein, such as the apparatus 100A, at 212, the tire speed may be used at 214 to determine a longitudinal slip of the tire or wheel. When a vehicle is accelerating or braking, a tire will slip in the direction of travel. The longitudinal slip may be defined as the ratio of tire speed to the vehicle speed, expressed as a percentage for example. Accordingly, the longitudinal slip may be determined at 214 as the ratio of the tire longitudinal speed to the vehicle (e.g., longitudinal) speed, whether estimated according to conventional techniques or determined (e.g., at 208) using an apparatus, such as the apparatus 100. Colloquially, a tire longitudinal slip may be considered a percentage of the vehicle speed, where no slip is represented by a percentage of 100%. As is clear from this description, while the tire lateral speed may be determined at 212, it is not required for the determination at 214.

A calibration of an apparatus according to the teachings herein, such as the apparatus 100, is described previously with regards to FIG. 5. Another calibration is described with reference to FIGS. 7 and 8, which are illustrations of a height measurement system for use in measuring the working distance, such as the working distance 110, to allow adjustment of one or more calibration values for the apparatus. The distance from the sensor (e.g., the optical lens, such as the optical lens 104) to the surface (e.g., the traveling surface 112 or wheel surface) can alter the calibration of the apparatus. More specifically, as the mounting height changes, the area on the surface covered by a single pixel may change. At the same sampling rate, more pixel displacement may be observed when the optical lens is closer to the surface than when the optical lens is further from the surface.

Figure 9:
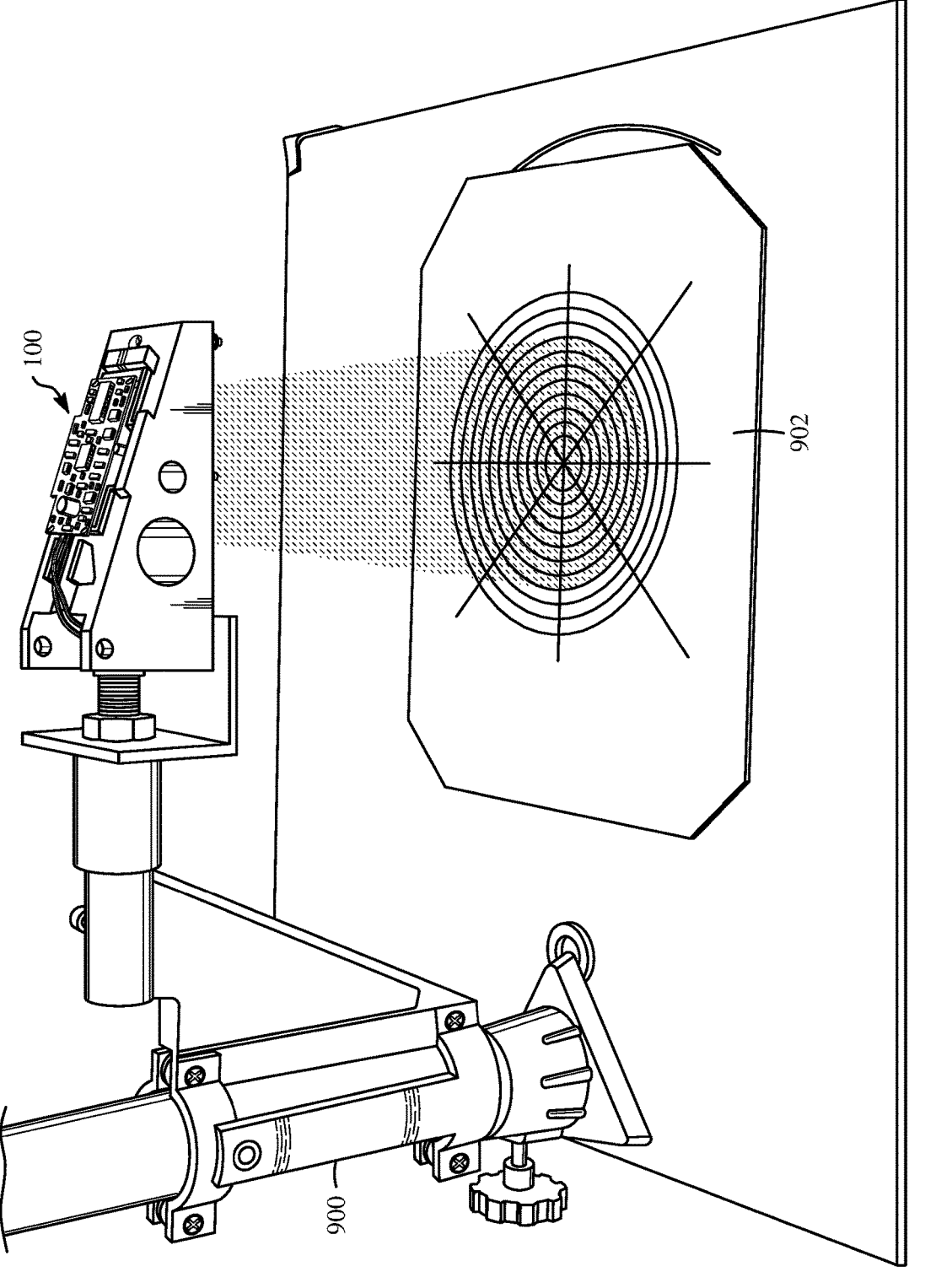
FIG. 9 is an illustration of a calibration apparatus for the apparatus of FIGS. 1A and 1B.

This may be explained with reference to FIG. 9, which illustrates how calibration of an apparatus, such as the apparatus 100 or 100A, may be achieved. The apparatus 100 is shown by example. An initial or default calibration may be achieved by securing the apparatus to a stand 900 at a pre-determined height that is based on the expected mounting height on a vehicle, such as the vehicle 300. This is also referred to herein as the initial or default working distance. The illumination center of the illumination device, such as the illumination system 116, is centered on a calibration graph 902 that is located at the image surface. Using the calibration graph 902, the pixel displacement may be measured at the sampling rate for use in the calibration described with regards to FIG. 5.

Although an initial or default calibration is described, in some implementations it may be desirable to adjust the calibration as the working distance changes. Surface irregularities, as well as vehicle ride and cornering motions can change this distance. Methods for doing this include optical, sonar, GPS, and laser (Lidar) distance detectors, as well as inertial measurements. A lens system with a constant field of view, such as a telecentric lens system, may be used to reduce or eliminate the need for this measurement and adjustment of the calibration.

Figure 7:
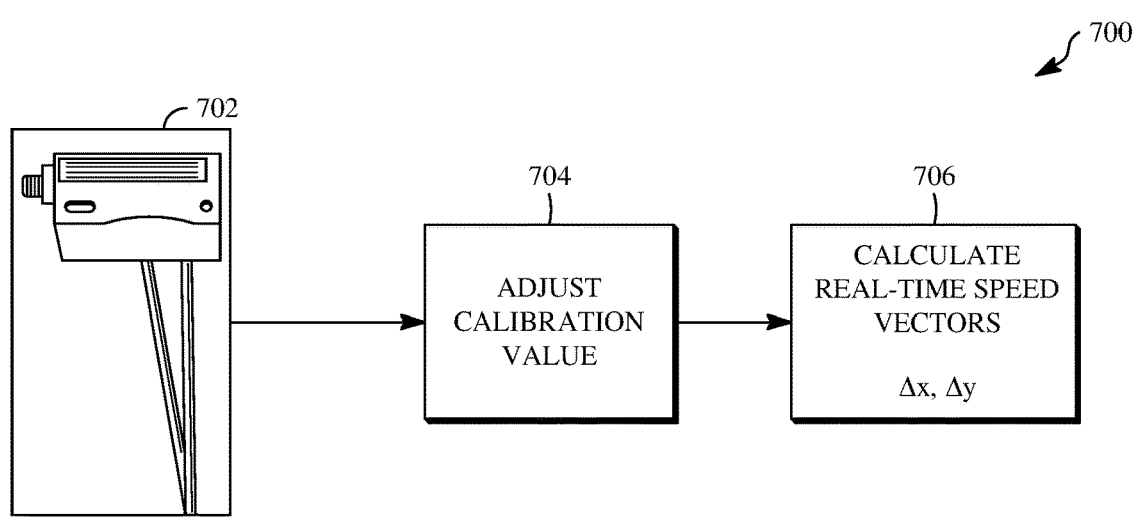
FIG. 7 is an illustration of a height sensing system utilizing laser or sonar detectors.

In the example shown in FIG. 7, a method 700 of height measurement employs sonar or laser detectors 702 to dynamically measure the height of the optical device from the traveling surface, such as the traveling surface 112. The detectors 702 measure the distance to the traveling surface. The method 700 then adjusts the calibration value at 704 and utilizes this adjusted calibration value to determine the vehicle's real-time speed vectors at 706. That is, the determinations at 706 may correspond to the determinations at 206.

Figure 8:
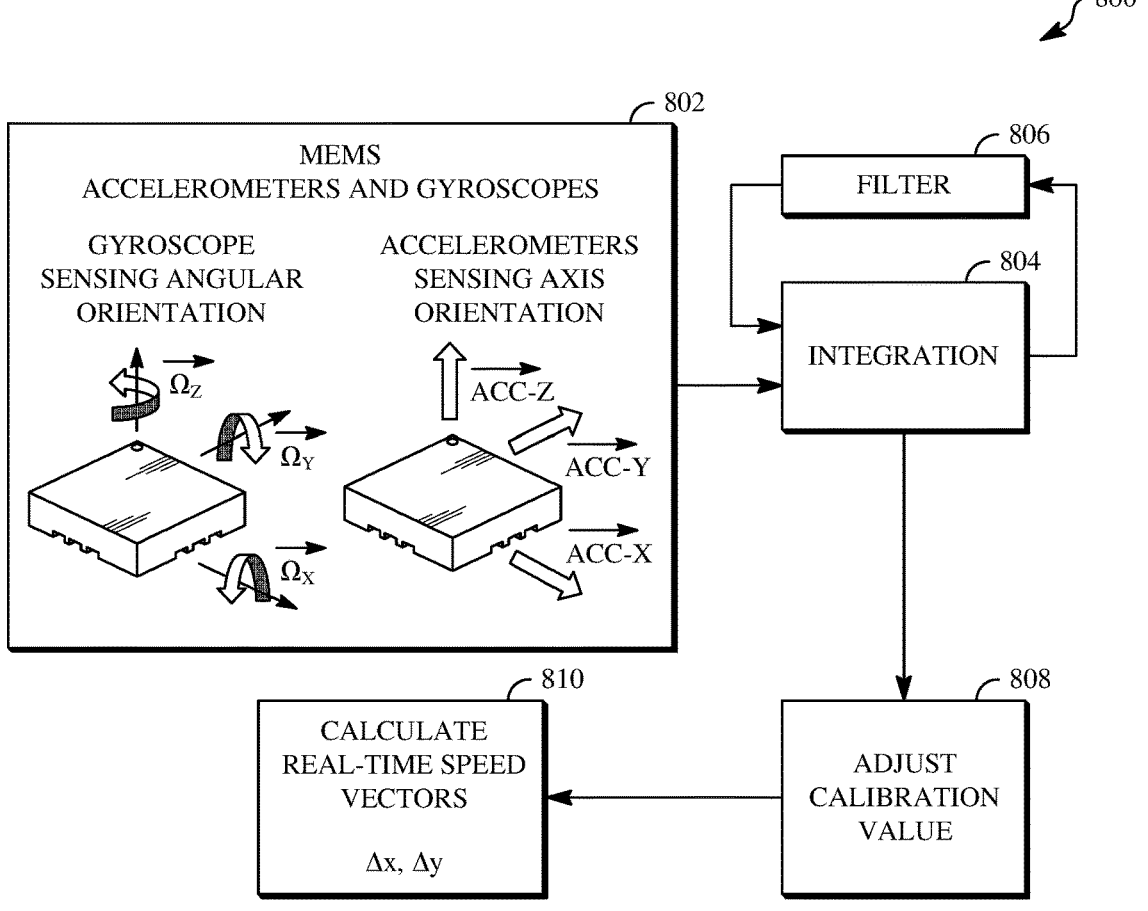
FIG. 8 is an illustration of a height sensing system utilizing inertial measurement devices.

In the example shown in FIG. 8, a method 800 of height measurement employs inertial measurement devices or sensors. As shown in FIG. 8, the inertial measurement devices or sensors 802 can include three accelerometers and three gyroscopes. Output from the sensors 802 may be time-integrated to achieve linear and rotational displacements. However, small amounts of sensor drift and zero-point settings, as well as hills and surface side slope, can result in errors to an integration result (i.e., to one or more of the displacements) unless properly accounted for.

Over any given time period, the mean distance from a sensor to a level (e.g., traveling or wheel) surface may remain mostly constant. Barring a flat tire, or passenger change, no significant alteration of this distance occurs. Small amounts of predictable change due to fuel consumption or tire air heating can either be ignored or can even be included in the calculations. This means that appropriate high-pass electronic filtering of the sensor data can eliminate integration drift error in determining the varying distance from the sensor to the surface. The filtering may use a simple high-pass filter, a multiple pole digital filter, or a Kalman filter tuned to a vehicle, such as a generic vehicle or the specific vehicle under test.

The method 800 of height measurement includes generating inertial measurements from the sensors 802 (e.g., from accelerometers and gyroscopes). The measurements are time integrated using integration 804 to achieve the linear and rotational displacements. The displacement values are passed through a filter 806. The filtered values are then utilized to adjust 808 the calibration value for an apparatus, such as the apparatus 100. The calibration value may then be utilized to determine the vehicle real time-speed vectors 810, which can correspond to the determinations at 206.

Although the description above includes both the determination of actual vehicle speed at 208 and side slip at 210, measurement of both is not always required. As noted above, the actual speed may vary with the distance from the lens to the traveling surface. Accordingly, to obtain high accuracy, the techniques herein describe optionally determining this distance. Even when a sensor is mounted at the wheel center, the distance can vary because of deflection of the associated tire. Significant complexity may be required to accurately determine this distance when the vehicle is moving, particularly when traversing bumps and cornering. In contrast, the calculation of side slip requires that the longitudinal speed be divided by the lateral speed as described initially. The factor determined by the distance is divided by itself and thus may not always influence the result. This means that the side slip angle is not influenced by any height correction so long as the surface remains in focus and the lateral and longitudinal calibration values or factors remain equal. For this reason, the calibration for correction of the distance may be omitted in an implementation where only the side slip angle is a desired output.

Although the description above describes the option of using the measured working distance to alter a calibration factor for an apparatus according to the teachings herein, other techniques may be used to correct for changes in the working distance during operation. For example, the image sensor is described as optionally including an adjustable sampling rate. In some implementations, different values for the sampling rate may be associated with a respective working distance such that, for example, the calibration between pixel speed and vehicle speed is a constant and/or the calibration between pixel speed and tire speed is a constant. Accordingly, as the working distance detected by a height sensor changes, the sampling rate may change so that there is no need to modify a calibration factor.

Referring back to FIG. 2, the method 200 outputs the determined vehicle parameters at 216. This may include some or all of the vehicle speed(s) determined at 208, the side slip angle(s) determined at 210, the tire speed(s) determined at 212, the tire longitudinal slip determined at 214, etc. The values may be used as inputs for vehicle control systems as described previously. That is, the values may be used to alter a vehicle behavior.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving a sequence of images of a traveling surface captured by an image sensor using an optical lens, wherein the image sensor is arranged on a vehicle with a wheel in contact with the traveling surface, the image sensor has a sampling rate, and the optical lens is arranged between the image sensor and the traveling surface;
determining a first distance traveled by one or more pixels in a longitudinal direction along the traveling surface by comparing at least two images of the sequence;
determining a second distance traveled by one or more pixels in a lateral direction along the traveling surface by comparing at least two images of the sequence;
determining a first pixel speed in the longitudinal direction using the first distance and the sampling rate;
determining a second pixel speed in the lateral direction using the second distance and the sampling rate;
determining at least one of:
a vehicle speed using at least one of the first pixel speed or the second pixel speed;
a side slip using the first pixel speed and the second pixel speed; or
a longitudinal slip using the first pixel speed and a tire speed; and
outputting the at least one of the vehicle speed, the side slip, or the longitudinal slip for modifying a vehicle operation.

2. The method of claim 1, comprising:
determining the tire speed as a tire longitudinal speed using a second apparatus comprising:
a second image sensor arranged on the vehicle, the second image sensor having a second sampling rate; and a second optical lens arranged between the second image sensor and a wheel surface, wherein determining the tire speed comprises:
receiving a sequence of images of the wheel surface captured by the second image sensor using the second optical lens;
determining a first longitudinal distance traveled by one or more pixels in the longitudinal direction by comparing at least two images of the sequence of images of the wheel surface;
determining a third pixel speed in the longitudinal direction using the first longitudinal distance and the second sampling rate; and
determining the tire longitudinal speed using the third pixel speed.

3. The method of claim 1, wherein outputting the at least one of the vehicle speed, the side slip, or the longitudinal slip comprises:
outputting the vehicle speed in the longitudinal direction, the vehicle speed in the lateral direction, and the side slip to a traction control system, an anti-lock braking system, or both.

4. The method of claim 1, wherein outputting the at least one of the vehicle speed, the side slip, or the longitudinal slip comprises:
transmitting, by a wireless communication transmitter, the at least one of the vehicle speed, the side slip, or the longitudinal slip.

5. The method of claim 1, comprising:
measuring, by a height sensor, a measured distance between the optical lens and the traveling surface; and
adjusting, using the measured distance, a speed calibration value for determining the vehicle speed using at least one of the first pixel speed or the second pixel speed.

6. An apparatus, comprising:
an image sensor arranged on a vehicle with at least one wheel in contact with a traveling surface, the image sensor having a sampling rate;
an optical lens arranged between the image sensor and the traveling surface; and
a processor coupled to the image sensor, the processor configured to:
receive a sequence of images of the traveling surface captured by the image sensor using the optical lens;
determine a first distance traveled by one or more pixels in a longitudinal direction along the traveling surface by comparing at least two images of the sequence;
determine a second distance traveled by one or more pixels in a lateral direction along the traveling surface by comparing at least two images of the sequence;
determine a first pixel speed in the longitudinal direction using the first distance and the sampling rate;
determine a second pixel speed in the lateral direction using the second distance and the sampling rate;
determine at least one of:
a vehicle speed using at least one of the first pixel speed or the second pixel speed;
a side slip using the first pixel speed and the second pixel speed; or
a longitudinal slip using the first pixel speed and a tire speed; and
output the at least one of the vehicle speed, the side slip, or the longitudinal slip for modifying a vehicle operation.

7. The apparatus of claim 6, comprising:

an illumination system directed at the traveling surface and mounted adjacent to the optical lens.

8. The apparatus of claim 7, wherein the illumination system comprises a light emitting diode illumination system.

9. The apparatus of claim 7, wherein the illumination system comprises infra-red light elements, white light elements, or some combination of infra-red light elements and white light elements.

10. The apparatus of claim 6, wherein the optical lens and the image sensor are mounted within one of a bumper, a body panel, a frame, or a chassis of the vehicle.

11. The apparatus of claim 6, wherein the optical lens and the image sensor are mounted on a bearing positioned at a spindle center of the at least one wheel.

12. The apparatus of claim 6, wherein the optical lens is mounted at an initial working distance from the traveling surface.

13. The apparatus of claim 12, comprising:

an autofocus assembly coupled to the optical lens to adjust to the initial working distance during relative movement between the traveling surface and the vehicle.

14. The apparatus of claim 6, wherein:

to determine the vehicle speed using at least one of the first pixel speed or the second pixel speed comprises to determine the vehicle speed using the first pixel speed and a speed calibration value that converts the first pixel speed to the vehicle speed;

the speed calibration value is determined using an initial working distance between the optical lens and a surface;

the apparatus comprises a height sensor arranged to determine a measured distance between the optical lens and the traveling surface; and the processor is configured to adjust, using the measured distance, the speed calibration value when the measured distance varies from the initial working distance.

15. The apparatus of claim 6, wherein the image sensor includes an adjustable sampling rate.

16. An apparatus, comprising:

an image sensor arranged on a vehicle with at least one wheel in contact with a traveling surface, the image sensor having a sampling rate;

an optical lens arranged between the image sensor and a wheel surface; and a processor coupled to the image sensor, the processor configured to:

receive a sequence of images of the wheel surface captured by the image sensor using the optical lens;

determine a first distance traveled by one or more pixels in a longitudinal direction by comparing at least two images of the sequence;

determine a second distance traveled by one or more pixels in a lateral direction by comparing at least two images of the sequence;

determine a first pixel speed in the longitudinal direction using the first distance and the sampling rate;

determine a second pixel speed in the lateral direction using the second distance and the sampling rate;

determine a tire longitudinal speed using the first pixel speed;

determine a tire lateral speed using the second pixel speed; and output at least one of the tire longitudinal speed or the tire lateral speed for modifying a vehicle operation.

17. The apparatus of claim 16, wherein the processor is configured to:

determine a longitudinal slip using the tire longitudinal speed and a vehicle speed in the longitudinal direction.

* * * * *